Feb. 24, 1942. H. R. VAAGE Re. 22,039

ORCHARD SPRAYER

Original Filed Sept. 6, 1938 2 Sheets-Sheet 1

INVENTOR:
HENRY R. VAAGE
BY O. O. Martin
ATTORNEY.

Feb. 24, 1942. H. R. VAAGE Re. 22,039

ORCHARD SPRAYER

Original Filed Sept. 6, 1938 2 Sheets-Sheet 2

INVENTOR:
HENRY R. VAAGE
BY O O Martin
ATTORNEY.

Reissued Feb. 24, 1942

Re. 22,039

UNITED STATES PATENT OFFICE 22,039

ORCHARD SPRAYER

Henry R. Vaage, Alhambra, Calif., assignor to Hardie Manufacturing Company, Hudson, Mich., a corporation of Michigan Original No. 2,218,776, dated October 22, 1940, Serial No. 228,587, September 6, 1938. Application for reissue April 28, 1941, Serial No. 390,851

8 Claims. (Cl. 299—39)

The present invention relates to devices for spraying plants and trees, and has particular reference to improved means for spraying the outer surfaces of such plants and trees.

In present day orchard practice it is customary to arrange fruit trees equally spaced in long parallel rows in order to provide straight passages between the rows for convenience in cultivation and spraying.

The object of the invention is to provide a simple and efficient device movable through the lanes of such orchards for the purpose of spraying the foliage of the trees in each row. More particularly it is the object of simultaneously spraying the trees on each side of the passage between the trees. It is the further object to provide convenient means for controlling the spraying operation in such manner that both sides may be sprayed at the same time or that the operation may be confined to one side only.

Another object is to provide means for controlling the direction of the spraying in order that the operator may be in a position to reach every part of the surface of the trees during the progress of the spraying equipment through the passage between the trees.

The further objects and advantageous features of the invention are hereinafter fully explained, and drawings are hereto attached in which referred forms of the invention are clearly illustrated.

Figure 2:
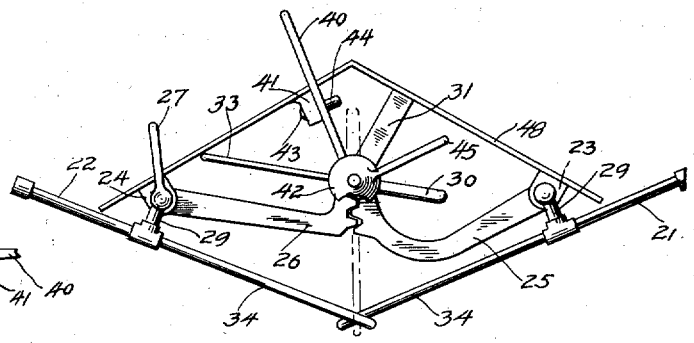
Fig. 2 is a substantially corresponding plan view of the device, separates from the vehicle; and, Fig. 3 is a rear elevation of the device in substantial agreement with the foregoing.
Figure 1:
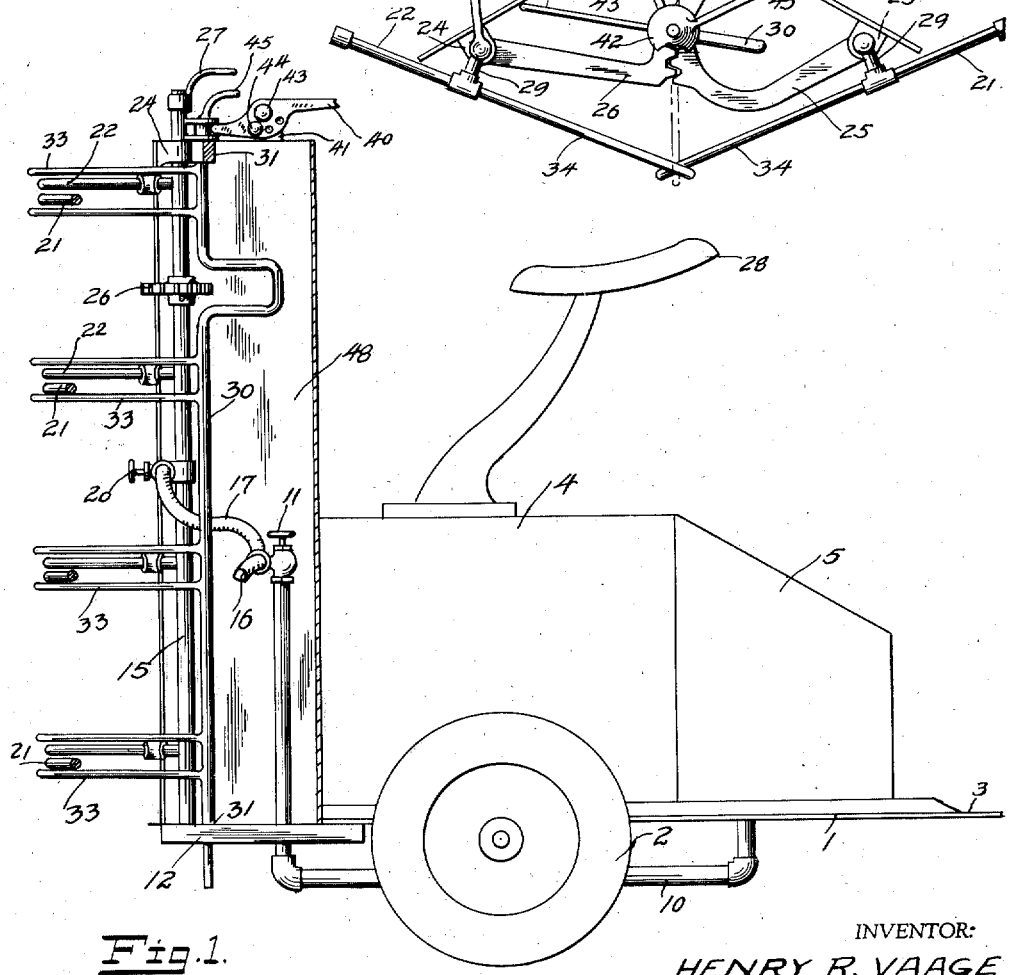
Fig. 1 is the side elevation of a vehicle on which the device of the invention is shown mounted, and it is shown partly in sections for the sake of clearness.
Figure 3:
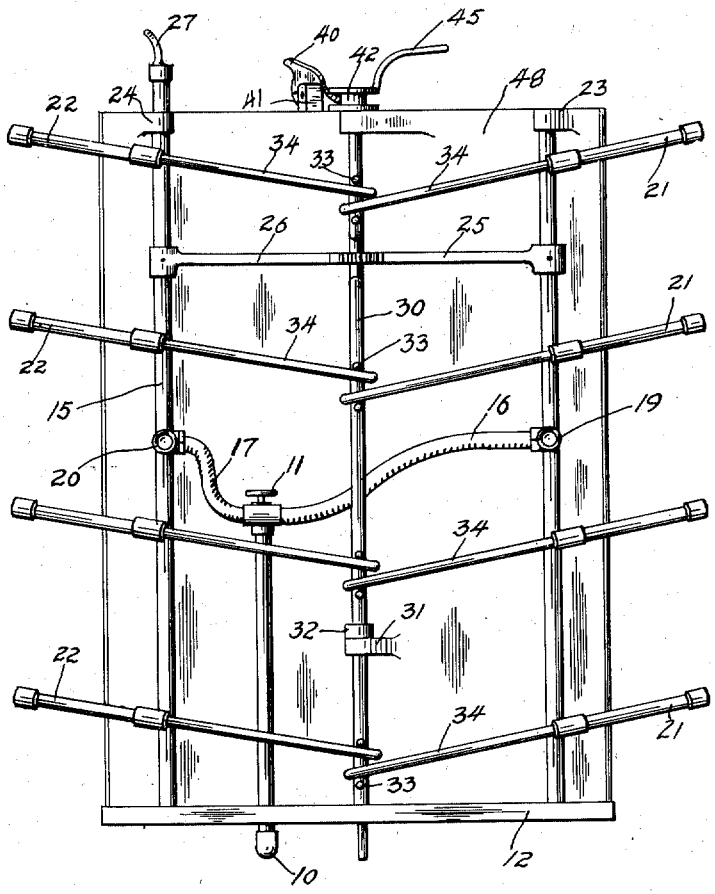

In modern practice, it is customary to mount spraying equipment on a truck propelled by a motor of the internal combustion type, or the truck may, of course, be drawn by a tractor or a team of horses or mules. It is also common practice to mount a spraying equipment on a trailer for attachment to such traction vehicle, and the device of the invention is in this instance, for the sake of simplicity, shown mounted on such trailer which in the drawings is indicated by the reference numeral 1. The trailer is shown mounted on suitable wheels 2, and it is provided with a tongue 3 for attachment to a traction vehicle. A tank 4 is shown mounted on the trailer, and a casing 5 extends forward from this tank. This casing encompasses a suitable pumping unit, but as such tank and pumping unit have found extensive use in commercial orchard spraying practice it is not here thought necessary to go into details of the construction of such mechanisms.

The liquid pumped from the tank passes through a pipe 10 conveniently located below the truck body, and it is shown vertically rising to a valve 11, by means of which the flow of the spraying liquid to the device of the invention is controlled.

A bracket 12 is provided at the rear end of the trailer, and standpipes 14—15 rise from this bracket in convenient position relative to the main control valve 11. These pipes are by means of flexible tubes 16, 17 operatively connected with the valve 11, and valves 19 and 20 and cut into the standpipes for the purpose of manually controlling the flow of the spraying liquid to the pipes. The latter are above and below the valves 19 and 20 fitted to receive series of nipples 29 which project laterally in the same vertical plane. On these nipples are journaled suitable nozzles 21 and 22. The standpipes 14 and 15 are seated to rotate in bearings 23 and 24, and they are connected for manual rotation by means of a pair of intermeshing gear segments 25, 26. One of the pipes is fitted with an operating handle 27, conveniently placed within easy reach of the operator, who stands on top of the tank 4 or may occupy a seat 28, provided for this purpose.

From this description, it is seen that the operator can swing the nozzles horizontally in opposite directions to reach every portion of the trees served by the device. The nozzles are all hung to swing on the horizontal nipples 29 for individual adjustment, in addition to which provision is made for swinging all the nozzles as body. To this end, a vertical shaft 30 is placed behind the two standpipes and evenly spaced therefrom. This shaft is rotatable in bearings 31 and it is shown supported axially by a collar 32, resting on one of the bearings. A series of forks 33 project from this shaft to straddle the inwardly projecting handles 34 of the nozzles 21, 22. When this shaft is moved axially, it is seen that the nozzles are caused to swing on their pivots correspondingly and that the direction of the spray in a vertical plane is controlled. Suitable means must be introduced to adjust the shaft 30 axially, and such means is here illustrated to comprise a lever 40, journaled on a post 41. The inner end of this lever is shown riding in a circular groove of a collar 42 of the shaft 30.

It should be clear to anyone familiar with the art that the lever 40 manually controls the axial movement of the shaft. The lever 40 is shown made with a row of perforations, arranged on a circular arc having the lever pivot 43 for its center and positioned to register with a socket in the post 41. A pin 44 is caused to engage the perforation of the lever which is found in registration with the post socket when the shaft is moved to swing the nozzles into the desired position, thereby to lock the lever, the shaft and the nozzles in this position.

If it is desired to operate the nozzles individually, it is merely required to turn the shaft until the forks swing out of engagement with the nozzle handles, and handle 45 is shown provided for facilitating this operation.

From the foregoing description, it should be clear to anyone versed in the art that the operator of the device from his position on the platform has perfect control of the device, and that he may turn the standpipes to direct the nozzles towards any portion of the rows of trees between which the trailer passes. It is customary when the end of the orchard is reached to turn the vehicle around the end of one of the rows of trees and down between the next two rows. During this turning movement, it is noticed that only the service of the nozzle adjacent to the tree around which the vehicle is driven is required, and that the flow through the nozzles on the opposite side of the vehicle may be disconnected by merely shutting off the standpipe valves 19 or 20, controlling these nozzles. Without these valves it is seen that a great deal of spraying liquid would be wasted.

As stated, the operator is standing or seated directly in front of the operating controls of the device and, when these are arranged at the proper height, he has unobstructed view of every portion of the trees to be sprayed. The devices are shown mounted on a frame 48, rising from the bracket 12, and this frame is shown V-shaped in horizontal cross section for stability and also for the purpose of shielding the operator from the vapors of the spray.

The drawings are merely illustrative of a preferred form of the invention, and no attention has been paid to exact proportioning of the various parts and combinations, it being the aim to show and describe as clearly as possible the principle and operations of the device of the invention; nor is it my intention to limit myself to the exact construction shown, but I reserve the right to make such modifications as may come within the scope of the following claims:

I claim:

1. A portable device for spraying liquid under pressure from a tank comprising a bracket rearwardly projecting from said tank, a V-shaped frame rising from said bracket, a pair of standpipes within the V of said frame, series of horizontally projecting nipples on said standpipes, nozzles journaled on said nipples for vertical swinging movement, and means for rotating said pipes to swing said nozzles horizontally.

2. A portable device for spraying liquid under pressure from a tank comprising a bracket rearwardly projecting from said tank, a V-shaped frame rising from said bracket, a pair of standpipes within the V of said frame, series of horizontally projecting nipples on said standpipes, nozzles journaled on said nipples for vertical swinging movement, means for swinging said nozzles vertically, and means for rotating said pipes to swing said nozzles horizontally.

3. A portable device for spraying liquid under pressure from a tank comprising a bracket rearwardly projecting from said tank, a V-shaped frame rising from said bracket, a pair of standpipes within the V of said frame and axially rotatable, means for interconnecting said pipes for simultaneous axial rotation, series of horizontally projecting nipples on said standpipes, nozzles journaled on said nipples for vertical swinging movement, and means for rotating said pipes to swing said nozzles horizontally.

4. A portable spraying device mountable at the end of a spraying tank comprising, a vertical framing, a pair of standpipes axially rotatable on said framing, nozzles mounted for vertical swinging movement relative to said pipes, means interconnecting said pipes for simultaneous rotation of the pipes, a vertical rod evenly spaced from said standpipes, means on said rod so engaging said nozzles that upon vertical movement of the last said means the above stated vertical swinging movement of the nozzles will result, means for axially moving said rod to swing said nozzles vertically relative, to the standpipes, and means for axially rotating said rod to swing said nozzle engaging means out of the way.

5. A portable device for spraying liquid under pressure from a tank comprising standpipes positioned adjacent to said tank for manual axial rotation, nozzles laterally projecting from said pipes, flexible connections between said pump and the said pipes, and arms on the pipes terminating in intermeshing gear segments interconnecting said pipes for simultaneous rotation.

6. In a device for spraying liquid under pressure from a tank, two standpipes vertically supported adjacent said tank, nozzles journaled on said standpipes for vertical swinging movement relative thereto, and means directly interconnecting said pipes for axial rotation in opposite directions.

7. In a device for spraying liquid under pressure from a tank, two standpipes vertically supported adjacent said tank, nozzles journaled on said standpipes for vertical swinging movement relative thereto, means directly interconnecting said standpipes for axial rotation in opposite directions, and means for interconnecting said nozzles for simultaneous vertical rotation on the standpipes.

8. In a device for spraying liquid under pressure from a tank, a pair of standpipes vertically supported adjacent said tank, nozzles journaled on said pipes for vertical swinging movement relative thereto, means directly interconnecting said pipes for axial rotation in opposite directions, means for interconnecting said nozzles for simultaneous vertical swinging movement on the pipes, and means for withdrawing said nozzle interconnecting means to release the nozzles for individual swinging movement.

HENRY R. VAAGE.